US006812732B1

(12) United States Patent
Bui (10) Patent No.: US 6,812,732 B1
(45) Date of Patent: Nov. 2, 2004

(54) PROGRAMMABLE PARALLEL ON-CHIP PARALLEL TERMINATION IMPEDANCE AND IMPEDANCE MATCHING

(75) Inventor: John Henry Bui, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/206,085

(22) Filed: Jul. 26, 2002

Related U.S. Application Data (60) Provisional application No. 60/337,226, filed on Dec. 4, 2001.

(51) Int. Cl.[7] .............................................. H03K 17/16
(52) U.S. Cl. .............................. 326/30; 326/27; 326/83
(58) Field of Search .............................. 326/26, 27, 30, 326/83, 86, 87

(56) References Cited

U.S. PATENT DOCUMENTS

| | | | |
|---|---|---|---|
| 4,719,369 A | * | 1/1988 | Asano et al. .................. 326/30 |
| 5,164,663 A | | 11/1992 | Alcorn |
| 5,359,235 A | | 10/1994 | Coyle et al. |
| 5,374,861 A | | 12/1994 | Kubista |
| 5,726,583 A | | 3/1998 | Kaplinsky |
| 5,764,080 A | | 6/1998 | Huang et al. |
| 5,864,715 A | | 1/1999 | Zani et al. |
| 5,955,911 A | | 9/1999 | Drost et al. |
| 5,970,255 A | | 10/1999 | Tran et al. |
| 6,008,665 A | | 12/1999 | Kalb et al. |
| 6,026,456 A | | 2/2000 | Ilkbahar |
| 6,037,798 A | | 3/2000 | Hedberg |
| 6,049,255 A | | 4/2000 | Hagberg et al. |
| 6,064,224 A | | 5/2000 | Esch, Jr. et al. |
| 6,087,847 A | | 7/2000 | Mooney et al. |
| 6,100,713 A | | 8/2000 | Kalb et al. |
| 6,147,520 A | | 11/2000 | Kothandaraman et al. |
| 6,157,206 A | | 12/2000 | Taylor et al. |
| 6,236,231 B1 | | 5/2001 | Nguyen et al. |
| 6,252,419 B1 | | 6/2001 | Sung et al. |
| 6,329,836 B1 | | 12/2001 | Drost et al. |
| 6,362,644 B1 | | 3/2002 | Jeffery et al. |
| 6,414,512 B1 | | 7/2002 | Moyer |
| 6,433,579 B1 | | 8/2002 | Wang et al. |
| 6,586,964 B1 | | 7/2003 | Kent et al. |
| 6,590,413 B1 | | 7/2003 | Yang |
| 6,603,329 B1 | | 8/2003 | Wang et al. |
| 6,639,397 B2 | | 10/2003 | Roth et al. |
| 6,642,741 B2 | | 11/2003 | Metz et al. |
| 2002/0010853 A1 | | 1/2002 | Trimberger et al. |
| 2002/0060602 A1 | | 5/2002 | Ghia et al. |
| 2002/0101278 A1 | | 8/2002 | Schultz et al. |
| 2003/0062922 A1 | | 4/2003 | Douglass et al. |
| 2004/0008054 A1 | | 1/2004 | Lesea et al. |

OTHER PUBLICATIONS

Altera, Apex 20K "Programmable Logic Device Family," Altera Corporation, Ver. 1.1, May 2001.

(List continued on next page.)

Primary Examiner—Don Le
(74) Attorney, Agent, or Firm—Townsend and Townsend and Crew LLP; Steven J. Cahill (57) ABSTRACT

Circuits that have programmable parallel on-chip termination impedance are provided. On-chip transistors provide parallel termination impedance to an I/O pin. The impedance of the on-chip transistors can be programmed by an impedance matching circuit in response to the value of external resistors. The impedance matching circuit can regulate the impedance of termination transistors that are coupled to numerous I/O pins on an integrated circuit. This technique eliminates the need for external resistors that provide parallel termination impedance to I/O pins.

20 Claims, 4 Drawing Sheets

OTHER PUBLICATIONS

Altera, Apex II "Programmable Logic Device Family," Altera Corporation, Ver. 1.1, May 2001.

Esch and Manley, Theory and Design of CMOS HSTL I/O Pads, The Hewlett Packard Journal, Aug. 1998.

Xilinx, "Virtex–II 1.5V Field Programmable Gate Arrays," Xilinx, DSO3102 (v1.5), Apr. 2, 2001.

Bendak, M. et al. (1996). "CMOS VLSI Implementation of Gigabyte/second computer network links," Dept. of Electrical and Computer Engineering University of California at San Diego, La Jolla, CA 92093–0407, *IEEE International Symposium on Circuits and Systems* pp. 269–272.

Boni, A. et al (2001). "LVDS I/O Interface for Gb/s–per–Pin Operation in 0.35–um CMOS," IEEE Journal of Solid–State Circuits, 36(4):706–711.

Xilinx, "Spartan–3 1.2V FPGA Family: Functional Description," Xilinx, DS099–2 (vt.2) Jul. 11, 2003.

Xilinx, "Virtex–II Platform FPGAs: Detailed Description," Xilinx, DS031–2 (v.3 1) Oct. 14, 2003.

Xilinx, "Virtex–II Pro Platform FPGAs: Functional Description," Xilinx, DS083–2 (v2.9) Oct. 14, 2003.

* cited by examiner

PROGRAMMABLE PARALLEL ON-CHIP PARALLEL TERMINATION IMPEDANCE AND IMPEDANCE MATCHING

CROSS-REFERENCES TO RELATED APPLICATIONS

This application claims the benefit of U.S. Provisional Patent Application No. 60/337,226, filed on Dec. 4, 2001, which is incorporated by reference herein.

BACKGROUND OF THE INVENTION

The present invention relates in general to programmable parallel on-chip termination impedance and impedance matching, and more particularly, to parallel on-chip termination impedance and impedance matching circuits and methods.

Signal reflection on transmission lines can cause distortion that degrades the overall quality of the signal. To minimize signal reflection, transmission lines are resistively terminated. In the case of integrated circuits that are in communication with other circuitry on, for example, a circuit board, termination is often accomplished by coupling an external termination resistor (e.g., a 50 Ohm resistor) to the relevant input/output (I/O) pins.

A termination resistor is typically coupled to every I/O pin receiving an input signal from a transmission line. Often hundreds of termination resistors are needed for an integrated circuit. Numerous external termination resistors can consume a substantial amount of board space. The use of external components for termination purposes can be cumbersome and costly, especially in the case of an integrated circuit with numerous I/O pins.

It is therefore desirable to provide on-chip termination impedance to eliminate the need for the external components. It is further desirable to make such on-chip termination impedance insensitive to process, supply voltage, and temperature (PVT) variations.

BRIEF SUMMARY OF THE INVENTION

The present invention provides efficient, flexible, and cost-effective on-chip parallel termination impedance. According to the present invention, termination transistors can provide parallel termination impedance to I/O pins on an integrated circuit. The impedance of the termination transistors is programmably adjustable. The impedance of the termination transistors can be programmed to meet different input/output standards.

The present invention also provides impedance matching circuitry. The impedance matching circuitry can match the impedance of the termination transistors to the impedance of external (off-chip) reference resistors. A user can change the impedance of the reference resistors to alter the impedance of the termination transistors. Thus, the impedance matching circuitry makes the termination transistors programmable.

A pair of external reference resistors can be used to control the parallel termination impedance provided to a large number of I/O pins on an integrated circuit. The present invention therefore eliminates the need for external components that are used to provide parallel termination impedance.

DETAILED DESCRIPTION OF THE INVENTION

Figure 1:
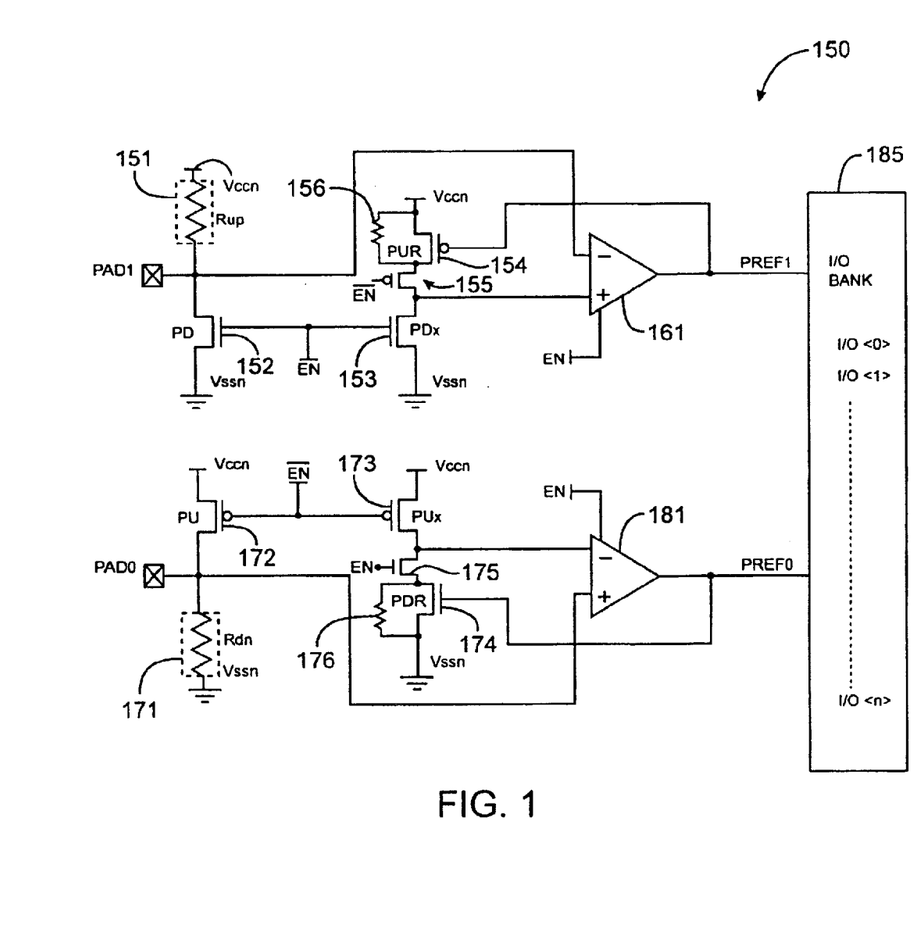
FIG. 1 shows a first embodiment of a circuit that provides on-chip parallel impedance matching according to the present invention.

FIG. 1 illustrates impedance matching circuit 150, which is a first embodiment of the present invention. Circuit 150 may be part of an integrated circuit. Circuit 150 includes amplifiers 161 and 181, input/output bank 185, resistors 156 and 176, and field-effect transistors 152–155, and 172–175. Resistors 151 and 171 are external off-chip resistors that are coupled to circuit 150 through I/O pins PAD1 and PAD0. Resistors 151 and 171 may have the same resistance value or different resistance values. Resistors 156 and 176 are internal diffusion resistors.

The gates of n-channel transistors 152 and 153 are coupled to an enable signal EN. Amplifier 161 is also coupled to the enable signal EN. Transistor 155 is coupled to /EN, the inverse of the enable signal. When the enable signal EN is HIGH and /EN is LOW, transistors 152, 153, 155 and amplifier 161 are ON. The enable signal is grounded to turn OFF transistors 152, 153, 155 and amplifier 161 to cut off the current through these circuit elements.

The inverting input of amplifier 161 is coupled to resistor 151 and transistor 152. The voltage at the inverting input of amplifier 161 is proportional to the drain-source ON resistance $R_{DS(ON)}$ of transistor 152 and inversely proportional to external resistor 151. The non-inverting input of amplifier 161 is coupled to transistors 153 and 155. The output of amplifier 161 is coupled to the gate of transistor 154.

Amplifier 161 controls the $R_{DS(ON)}$ of transistor 154. Amplifier 161 adjusts the drain-source ON resistance $R_{DS(ON)}$ of transistor 154 so that the voltages at the two amplifier input terminals are equal to each other. Amplifier 161 and transistor 154 form a feedback loop that causes the voltage drop across transistors 154 and 155 to equal the voltage drop across resistor 151.

The gates of transistors 172 and 173 are coupled to the inverse of the enable signal /EN. Amplifier 181 and the gate of transistor 175 are coupled to the enable signal EN. When /EN is LOW and EN is HIGH, transistors 172–173, 175 and amplifier 181 are ON. When /EN goes HIGH and EN goes LOW, transistors 172–173, 175 and amplifier 181 are OFF, and current is cut off in these circuit elements.

The voltage at the inverting input of amplifier 181 is proportional to the resistance of external resistor 171. The non-inverting input of amplifier 181 is coupled to the drains of transistors 173 and 175. The output of amplifier 181 controls the gate voltage of transistor 174.

Amplifier 181 sets the current through transistor 174 so that the differential voltage across the two amplifier input terminals is zero (or about zero). Thus, amplifier 181 and transistor 174 form a feedback loop that causes the voltage drop across transistors 174–175 to equal the voltage drop across resistor 171.

Resistor 156 is added in parallel with transistor 154 so that the area of transistor 154 can be reduced. Resistor 156 also reduces the non-linearity of transistor 154. Resistor 176 is added in parallel with transistor 174 so that the area of transistor 174 can be reduced. Resistor 176 also reduces the non-linearity of transistor 174.

Figure 2:
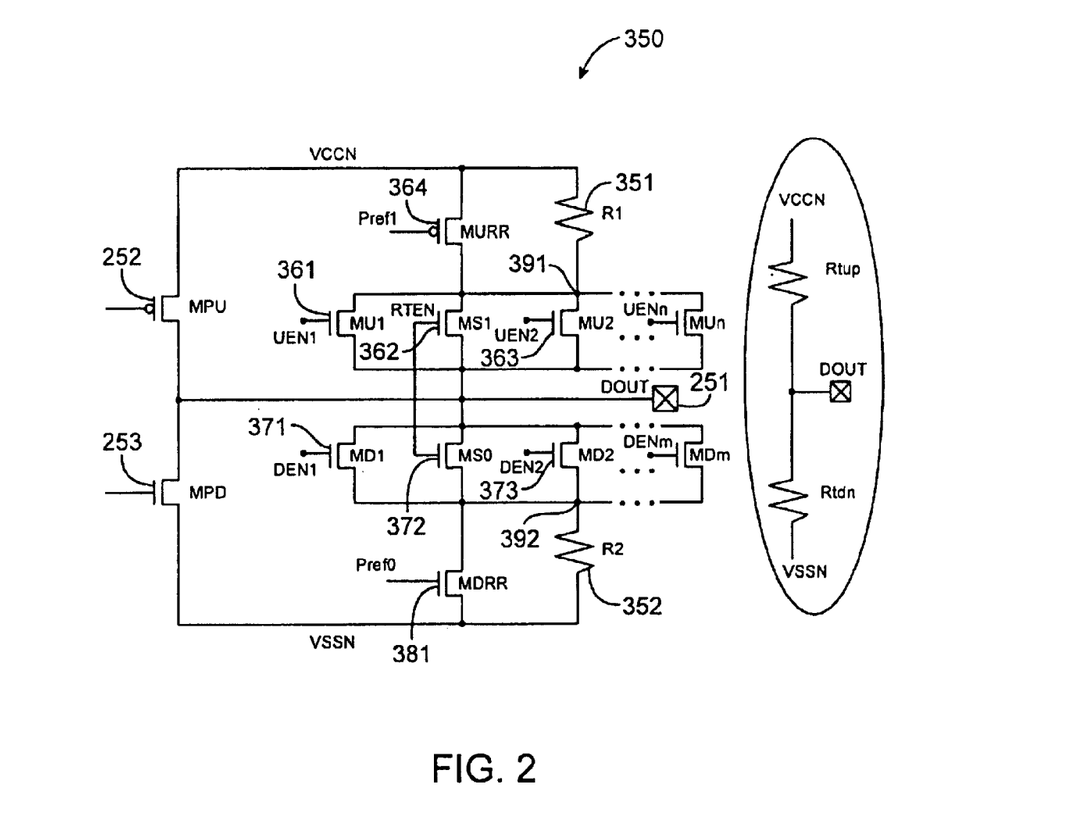
FIG. 2 is a schematic of a circuit that provides on-chip parallel termination impedance at an I/O pin with output sensing level controls according to the present invention.

The output of amplifiers 161 and 181 are coupled to circuitry in input/output (I/O) bank 185. FIG. 2 illustrates an example of circuitry in I/O bank 185. On-chip termination circuit 350 provides parallel termination impedance at I/O pin 251.

Circuit 350 includes pull up transistor 252 and pull down transistor 253. Output pre-driver circuitry (not shown) on the integrated circuit is coupled to the gates of transistors 252 and 253. The drive circuitry can cause pull up transistor 252 to drive the voltage on I/O pin 251 to a high voltage ($V_{OH}$). The driver circuitry can also cause transistor 253 to drive the voltage on pin 251 to a low voltage ($V_{OL}$).

For example, when transistor 252 is ON and transistor 253 is OFF, the voltage on pin 251 may be driven high (near $V_{CCN}$). When transistor 252 is OFF and transistor 253 is ON, the voltage on pin 251 may be driven low (near $V_{SSN}$ or ground). Further details of circuits that provide on-chip series impedance termination and impedance matching are discussed in commonly assigned U.S. patent application Ser. No. 10/206,250, to Bui et al., filed concurrently herewith, which is incorporated by reference.

Transistor 152 represents the output pull down transistor 253. The channel W/L ratio of ratio of transistor 152 is the same or proportional to transistor 253.

Transistors 152 and 153 have the same or proportional channel width-to length (W/L) ratio. Resistor 156 has the same or proportional resistance to resistor 351. Transistor 154 has the same or proportional W/L ratio of transistor 364. Transistor 155 has the same or proportional W/L ratio as transistors 361–363 in parallel.

For example, the W/L of transistor 153 may be ½ the W/L transistor 152. Resistor 156 may have ½ the resistance of resistor 351. Transistors 154 and 155 may have ½ the channel W/L ratio of transistors 364 and 361–363 (FIG. 2), respectively.

If the W/L of transistor 153 is reduced relative to transistor 152, and the W/L of transistors 154–155 and the resistance of resistor 156 are reduced, the current through transistors 153–154 and resistor 156 is reduced.

The area of circuit 150 may also be reduced further by reducing the size of transistor 152. Note than when reducing the size of transistor 152, the external resistor 151 value must be increased. For example, if the W/L of transistor 152 is reduced by 1/10, then the resistance of resistor 151 should be increased by 10 times. The W/L of transistor 152 is inversely proportional to the resistance of resistor 151.

If the channel W/L ratios of transistors 152 and 153 are equal, the current through transistor 155 equals the current through resistor 151, and the resistance of resistor 156 and transistors 154–155 equals the resistance of resistor 151.

Transistor 173 has the same or proportional channel W/L ratio as transistor 172. Resistor 176 has the same or proportional resistance as resistor 352. Transistor 174 has the same or proportional channel W/L ratio of transistor 381. Transistor 175 has the same or proportional channel W/L ratio as transistors 371–373 in parallel.

As discussed above with respect to transistor 154, the ratio of the channel W/L of transistor 173 to the channel W/L of transistor 172 determines the ratio of the $R_{DS(ON)}$ of transistors 174–175 and the size of resistor 176 to the external resistance of resistor 171 and transistors 371–373, 381.

Referring again to FIG. 2, circuit 350 includes on-chip termination transistors 364 and 381. Termination transistors 364 and 381 provide parallel termination impedance adjustment at pin 251. The gate of p-channel transistor 364 is coupled to the output of amplifier 161, and the gate of n-channel transistor 381 is coupled to the output of amplifier 181.

Circuit 350 also includes n-channel transistors 361–363 and n-channel transistors 371–373. Transistor 155 has the same or proportional channel W/L ratio as transistors 361–363. Transistor 154 has the same or proportional channel W/L ratio as transistor 364. Transistor 175 has the same or proportional channel W/L ratio as transistors 371–373 (e.g., ½, ¼, or 10 times). Transistor 174 has the same or proportional channel W/L ratio as transistor 381.

Impedance matching circuit 150 can match the impedance of the termination transistors to the resistance of external resistors 151 and 171. The ratio of the channel W/L of transistor 364 to the channel W/L of transistor 154 determines the $R_{DS(ON)}$ of transistor 364. For example, if transistors 364 and 154 have the same channel W/L, then these transistors have the same ON resistance $R_{DS(ON)}$ (assuming that transistor 364 remains in saturation between voltages $V_{OH}$ and $V_{OL}$ at pin 251).

Other parallel termination transistors in I/O bank 185 (in addition to the transistors shown in FIG. 2) provide parallel termination impedance to other I/O pins. These additional termination transistors are also controlled by amplifiers 161 and 181. The present invention eliminates the need for external reference resistors that provide parallel termination impedance to I/O pins. Circuit 150 may, for example, control parallel termination impedance provided to several hundred I/O pins. A user can select values for resistors 151 and 171 to set the parallel impedance termination for all of the pins on the integrated circuit.

Resistor 351 is coupled between $V_{CCN}$ and node 391 in parallel with termination transistor 364. Resistor 156 may have the same or proportional resistance value as resistor 351.

Resistor 351 conducts a small portion of the current that flows from $V_{CCN}$ to node 391. Resistor 351 is added to the circuit so that the size (channel W/L) of transistor 364 can be reduced to save die area. Resistor 351 also reduces the non-linearity of the resistivity of transistor 364. The values resistors 156 and 176 are the same or proportional to resistors 351 and 352, respectively. Resistor 351 and 352 must be optimized so that the calibration range still has enough margin.

Resistor 352 is coupled between node 392 and $V_{SSN}$ in parallel with termination transistor 381. Resistor 176 may have the same or proportional resistance value as resistor 352. Resistor 352 conducts a small portion of the current that flows from node 392 to $V_{SSN}$. Resistor 352 is added to the circuit so that the size (channel W/L) of transistor 381 can be reduced to save die area. Resistor 352 also reduces the non-linearity of the resistivity of transistor 381.

Circuit 350 has output level sensing controls according to an embodiment of the present invention. Transistors 361–363 are coupled in parallel between node 391 and pin 251. Transistors 371–373 are coupled in parallel between pin 251 and node 392.

Any number of additional transistors $MU_N$ may be coupled in parallel with transistors 361–363. Transistor 155 has a channel W/L ratio that is the same or proportional to the combined channel W/L of transistors 361–363 and all of the additional transistors $MU_N$ that are coupled in parallel to them.

Also, any number of additional transistors $MD_M$ may be coupled in parallel with transistors 371–373. Transistor 175 has a channel W/L ratio that is the same or proportional to the combined channel W/L of transistors 371–373 and all of the additional transistors $MD_M$ that are coupled in parallel to them.

The gate of transistor 361 is coupled to receive a voltage UEN1. The gate of transistor 363 is coupled to receive a voltage UEN2. The gate of transistor 371 is coupled to receive a voltage DEN1. The gate of transistor 373 is coupled to receive a voltage DEN2.

The gates of additional transistors $MU_N$ are coupled to receive reference voltages $UEN_N$. The gates of additional transistors $MD_M$ are coupled to receive reference voltages DEN$_M$. Additional transistors MU$_N$ and MD$_M$ and signals UEN$_N$ and DEN$_M$ provide optimum control of the edge rate during switching transitions.

The gates of transistors 362 and 372 are coupled to receive voltage RTEN. RTEN is usually LOW and is only HIGH to turn ON transistor 362 and 372 when the I/O is tri-stated so that the output level is kept at the V$_{TT}$ level. V$_{TT}$ level is approximately V$_{CCN}$/2. Transistors 362 and 372 only turn ON when the output node 251 is at the V$_{TT}$ level. These transistors are not required to be included in the calibration circuit 350. The W/L ratio of transistors 362 and 372 should be designed to be minimum but still be able to hold pin 251 at the V$_{TT}$ level.

Figure 3:
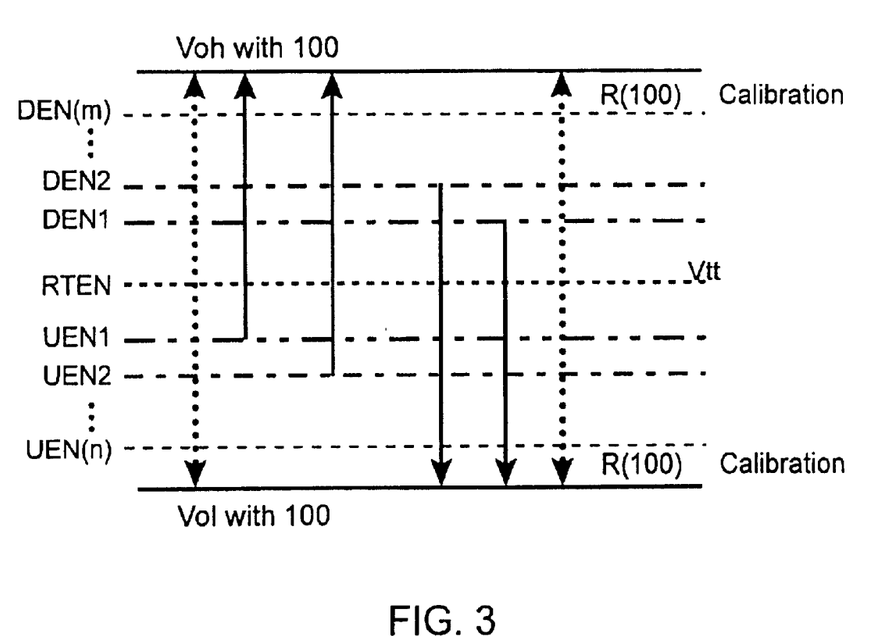
FIG. 3 illustrates exemplary calibration control levels to enhance the performance of parallel termination impedance according to the present invention.

FIG. 3 illustrates example voltage levels for signals DEN1, DEN2, RTEN, UEN1, UEN2, UEN$_N$, and DEN$_M$ with respect to V$_{OH}$ and V$_{OL}$. One advantage of circuit 350 is that the voltage on pin 251 transitions quickly from V$_{OH}$ to V$_{OL}$ and from V$_{OL}$ to V$_{OH}$. When pull up transistor 252 turns OFF and pull down transistor 253 turns ON, the voltage on pin 251 begins to swing from V$_{OH}$ to V$_{OL}$. When the output voltage on pin 251 is at V$_{OH}$, transistors 361 and 363 are OFF, and transistors 371 and 373 are ON. When transistors 371 and 373 are ON, the net resistance between node 392 and pin 251 is decreased, which increases the current from pin 251 to V$_{SSN}$. Therefore, the voltage on pin 251 decreases faster.

The current that flows through transistor 253 pulls the voltage on pin 251 down to V$_{OL}$. When the voltage on pin 251 falls to DEN2, transistor 373 turns OFF. When the voltage on pin 251 falls to DEN1, transistor 371 turns OFF.

When the pin 251 voltage falls below UEN1, transistor 361 turns ON. When the pin 251 voltage falls below UEN2, transistor 363 turns ON. Transistors 361 and 363 are now ON. Subsequently, the pin 251 voltage falls to V$_{OL}$. The gradual turning ON of transistor 361 and 363 keeps the following transition faster and smoother. Note that the control transistors and control signals can be optimized in the circuit design to make the transitions at node output node 251 faster and smoother. There is no current fighting against pull down transistor 253, but only helping current pulling the voltage down faster during the high-to-low down transition before output node 251 moves past the midpoint.

When pull down transistor 253 turns OFF and pull up transistor 252 turns ON, the voltage on pin 251 begins to swing from V$_{OL}$ to V$_{OH}$. When the output voltage on pin 251 is at a low level V$_{OL}$, transistors 371 and 373 are OFF, and transistors 361 and 363 are ON. When transistors 361 and 363 are ON, the net resistance between node 391 and pin 251 is decreased, which increases the current from V$_{CCN}$ to pin 251. Therefore, the voltage on pin 251 increases to V$_{OH}$ faster.

The current that flows through transistor 252 pulls the voltage on pin 251 up to V$_{OH}$. When the voltage on pin 251 rises to UEN2, transistor 363 is OFF. When the voltage on pin 251 rises further to UEN1, transistor 361 is OFF. 501 When the pin 251 voltage rises to DEN1, transistor 371 is ON. When the pin 251 voltage rises to DEN2, transistor 373 is ON. Both of transistors 371 and 373 are now ON. Subsequently, the pin 251 voltage rises to V$_{OH}$. The gradual turning ON of transistor 371 and 373 helps to keep the rising edge fast and smooth. There is no current fighting against pull up transistor 252 before output node 251 moves past the midpoint.

Circuit 350 provides parallel termination impedance to pin 251. Equivalent parallel termination resistors are represented as Rtup and Rtdn in FIG. 2. In other embodiments of the present invention, any of n-channel transistors 361–363, 155, 371–373 and 175 may be substituted with p-channel transistors. Also, p-channel transistors 364 and 154 can be substituted with n-channel transistors.

In another embodiment of the present invention, only circuit elements 151–154, circuit elements 171–174, and amplifiers 161 and 181 are included in circuit 150. Circuit elements 155, 156, 175, and 176 can be eliminated. In this embodiment, only transistors 252–253, 364, and 381 are needed in circuit 350. Circuit elements 351, 361–363, 352, and 371–373 can be eliminated.

During a tri-state condition, only transistors 362 and 372 are ON to bring the output voltage to Vtt to stabilize the output. Transistors 361, 363, 371, and 373 are all OFF to reduce current from the supply voltage to ground. Because transistors 361, 363, 371, and 373 do not turn ON simultaneously, the sizes of these transistors can be designed smaller. Thus, die area is smaller, and current is reduced during operation.

Figure 4:
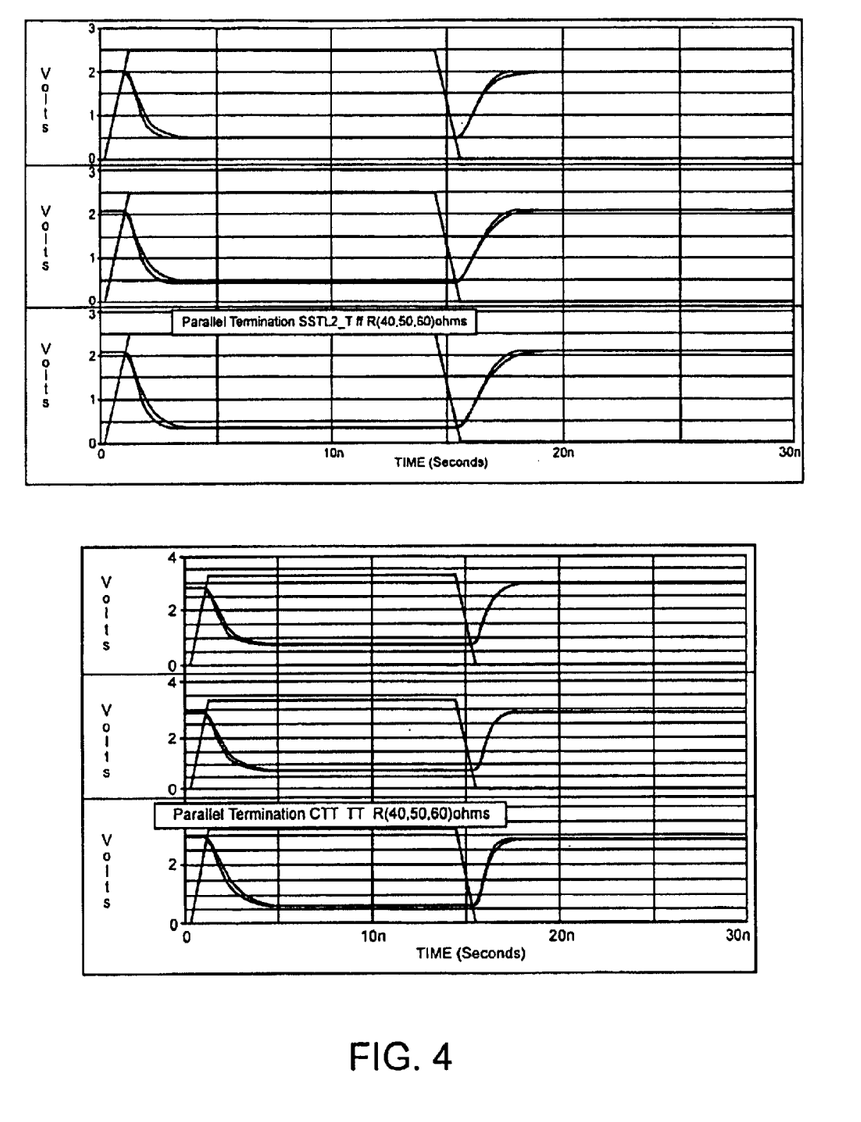
FIG. 4 show simulation results comparing the performance of on-chip and off-chip termination resistance for an exemplary SSTL2 I/O standard.

The improvement in speed during high-to-low and low-to-high transitions is shown in FIG. 4. FIG. 4 illustrates simulation results for high-to-low and low-to-high transitions on an I/O pin using on-chip parallel termination impedance in accordance with the present invention. The top half of FIG. 4 illustrates simulation results for an exemplary SSTL2 class 1 impedance matching standard with 40 ohm, 50 ohm, and 60 ohm resistances. Each of the traces in the top half of FIG. 4 graphs includes a signal from an on-chip termination impedance circuit of the present invention and a signal from off-chip termination resistors. The signal traces showing the faster rise and fall times were taken from the on-chip termination impedance circuit of the present invention.

The bottom half of FIG. 4 illustrates simulation results for an exemplary CTT impedance matching standard with 40 ohm, 50 ohm, and 60 ohm resistances using an on-chip impedance termination circuit of the present invention and off-chip termination resistors. Each of the three traces in the bottom half of FIG. 4 graphs includes a signal from an on-chip termination impedance circuit of the present invention and a signal from off-chip termination resistors. The signal traces in each of the three graphs showing the faster rise and fall times were taken from the on-chip termination impedance of the present invention.

Another advantage of circuits 150 and 350 is that they provide on-chip parallel termination impedance that is not sensitive to process, voltage, and temperature variations in the integrated circuit. When process, voltage, or temperature variations in the integrated circuit cause the ON resistance R$_{DS(ON)}$ of transistor 152 to increase, the R$_{DS(ON)}$ of transistor 153 also increases proportionally. When process, voltage, or temperature variations in the integrated circuit cause the ON resistance R$_{DS(ON)}$ of transistor 152 to decrease, the R$_{DS(ON)}$ of transistor 153 also decreases proportionally.

In either case, the ratio of the currents through transistors 152 and 153 remains constant. Also, the R$_{DS(ON)}$ of transistor 155 and transistor 154 (in parallel with resistor 156) (and R$_{DS(ON)}$ of transistor 364 in parallel with resistor 351 plus the R$_{DS(ON)}$ of transistor 361 in parallel with the R$_{DS(ON)}$ of transistor 363), continue to match resistor 151.

The ratio of the R$_{DS(ON)}$ of transistors 172 and 173 adjust to process, voltage, and temperature variations. Also, the R$_{DS(ON)}$ of transistor 175 and transistor 174 (in parallel with resistor 176) (and the R$_{DS(ON)}$ of transistor 381 in parallel with resistor 352 plus the R$_{DS(ON)}$ of transistor 371 in parallel with the R$_{DS(ON)}$ of transistor 373), continue to match resistor 171.

The various specific embodiments described above are presented for illustrative purposes only and are not intended to be limiting. It is to be understood that the termination resistance implemented according to the teachings of the present invention is not limited to any certain resistance values or any given I/O standards. The invention can implement on-chip termination resistance that matches almost any pull up or pull down resistor values for any I/O standards that need parallel terminations or just pull up and/or pull down resistors. The termination voltages can be designed at different levels other than $V_{CC}$, $V_{CCN}$, and $V_{tt}$. Some I/O standards only need pull up resistors, such as GTL and PCML standards. The present invention provides various embodiments of on-chip parallel termination impedance for most I/O standards including, for example, SSTL2, SSTL3 class 1 and class 2, CTT, GTL and HSTL.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. An integrated circuit comprising:
   a first transistor that provides parallel termination impedance to a first input/output pin;
   a second transistor that provides parallel termination impedance to the first input/output pin;
   a third transistor that provides parallel termination impedance to a second input/output pin;
   a fourth transistor that provides parallel termination impedance to a second input/output pin;
   a first amplifier coupled to the first and the third transistors;
   a fifth transistor coupled to a first input of the first amplifier and an output of the first amplifier;
   a second amplifier coupled to the second and the fourth transistors; and
   a sixth transistor coupled to a first input of the second amplifier and an output of the second amplifier.

2. The integrated circuit of claim 1 wherein a second input of the first amplifier is coupled to a first external resistor; and a second input of the second amplifier is coupled to a second external resistor.

3. The integrated circuit of claim 1 further comprising:
   a seventh transistor coupled to the first input of the first amplifier;
   an eight transistor coupled to a second input of the first amplifier;
   a ninth transistor coupled to the first input of the second amplifier; and
   a tenth transistor coupled to a second input of the second amplifier.

4. The integrated circuit of claim 1 further comprising:
   a first resistor coupled in parallel with the first transistor;
   a third transistor coupled in series with the first transistor, the third transistor receiving a first threshold voltage at an input; and
   a fourth transistor coupled in parallel with the third transistor, the fourth transistor receiving a second threshold voltage at an input.

5. The integrated circuit of claim 4 further comprising:
   a second resistor coupled in parallel with the second transistor;
   a fifth transistor coupled in series with the second transistor, the fifth transistor receiving a third threshold voltage at an input; and
   a sixth transistor coupled in parallel with the fifth transistor, the sixth transistor receiving a fourth threshold voltage at an input.

6. An integrated circuit comprising:
   first and second transistors that provide parallel termination impedance to a first input/output pin;
   a first feedback loop circuit that controls the impedance of the first transistor, wherein the first feedback loop circuit comprises a first amplifier coupled to a first resistor that is external to the integrated circuit; and
   a second feedback loop circuit that controls the impedance of the second transistor, wherein the second feedback loop circuit comprises a second amplifier coupled to a second resistor that is external to the integrated circuit.

7. An integrated circuit comprising:
   first and second transistors that provide parallel termination impedance to a first input/output pin;
   a first feedback loop circuit that controls the impedance of the first transistor;
   a second feedback loop circuit that controls the impedance of the second transistor,
   a third transistor that provides parallel termination impedance to a second input/output pin; and
   a fourth transistor that provides parallel termination impedance to the second input/output pin, wherein the first feedback loop circuit controls the impedance of the third transistor, and the second feedback loop circuit controls the impedance of the fourth transistor.

8. An integrated circuit comprising:
   first and second transistors that provide parallel termination impedance to a first input/output pin;
   a first feedback loop circuit that controls the impedance of the first transistor;
   a second feedback loop circuit that controls the impedance of the second transistor;
   a first resistor coupled in parallel with the first transistor;
   third and fourth transistors coupled in parallel between the first transistor and the input/output pin;
   a second resistor coupled in parallel with the second transistor; and
   fifth and sixth transistors coupled in parallel between the second transistor and the input/output pin.

9. The integrated circuit of claim 8 further comprising:
   a seventh transistor coupled in parallel with the third and fourth transistors, an input of the seventh transistor receiving an enable signal; and
   an eighth transistor coupled in parallel with the fifth and sixth transistor, an input of the eighth transistor receiving the enable signal.

10. The integrated circuit of claim 8 wherein the first feedback loop circuit comprises a first amplifier coupled to a ninth transistor, and the second feedback loop circuit comprises a second amplifier coupled to a tenth transistor.

11. A method for providing parallel termination impedance to a first pin on an integrated circuit, the method comprising:
   monitoring the resistance of a first off-chip resistor;
   setting the impedance of a first on-chip transistor in response to the first off-chip resistor;
   monitoring the resistance of a second off-chip resistor; and setting the impedance of a second on-chip transistor in response to the second off-chip resistor, the first and the second on-chip transistors providing parallel termination impedance to the first pin.

12. The method of claim 11 wherein monitoring the resistance of the first off-chip resistor comprises adjusting the impedance of a third transistor using a first amplifier, and monitoring the resistance of the second off-chip resistor comprises adjusting the impedance of a fourth transistor using a second amplifier.

13. The method of claim 12 wherein setting the impedance of the first on-chip transistor in response to the first off-chip resistor comprises controlling a gate voltage of the first on-chip transistor using the first amplifier; and setting the impedance of the second on-chip transistor in response to the second off-chip resistor comprises controlling a gate voltage of the second on-chip transistor using the second amplifier.

14. The method of claim 13 wherein monitoring the resistance of the first off-chip resistor further comprising coupling an input of the first amplifier to the first off-chip resistor, and monitoring the resistance of the second off-chip resistor further comprises coupling an input of the second amplifier to the second off-chip resistor.

15. The method of claim 11 further comprising:

coupling a first on-chip resistor in parallel with the first on-chip transistor; and coupling a second on-chip resistor in parallel with the second on-chip transistor.

16. The method of claim 15 further comprising:

turning ON a third transistor coupled in series with the first on-chip transistor when the voltage on the first pin decreases below a first threshold;

turning ON a fourth transistor coupled in parallel with the third transistor when the voltage on the first pin decreases below a second threshold;

turning ON a fifth transistor coupled in series with the second on-chip transistor when the voltage on the first pin increases above a third threshold; and turning ON a sixth transistor coupled in parallel with the fifth transistor when the voltage on the first pin increases above a fourth threshold.

17. The method of claim 11 further comprising:

setting the impedance of a third on-chip transistor in response to the first off-chip resistor; and setting the impedance of a fourth on-chip transistor in response to the second off-chip resistor, the third and the fourth on-chip transistors providing parallel termination impedance to a second pin.

18. The method of claim 11 further comprising:

providing series termination impedance to the first pin using a third pull up on-chip transistor; and providing series termination impedance to the first pin using a fourth pull down on-chip transistor.

19. An integrated circuit comprising:

first and second transistors that provide parallel termination impedance to a first input/output pin;

a first feedback loop circuit that controls the impedance of the first transistor, wherein the first feedback loop circuit comprises a first amplifier, and a third transistor coupled to a first input and an output of the first amplifier; and a second feedback loop circuit that controls the impedance of the second transistor, wherein the second feedback loop circuit comprises a second amplifier, and a fourth transistor coupled to a first input and an output of the second amplifier.

20. The integrated circuit of claim 18 further comprising:

a fifth transistor coupled to the first input of the first amplifier;

a sixth transistor coupled to a second input of the first amplifier and a second pin;

a seventh transistor coupled to the first input of the second amplifier; and an eighth transistor coupled to a second input of the second amplifier and a third pin.

* * * * *